C. JOHNSTON.
WHEEL GUARD.
APPLICATION FILED JULY 1, 1907.
911,881.
Patented Feb. 9, 1909.
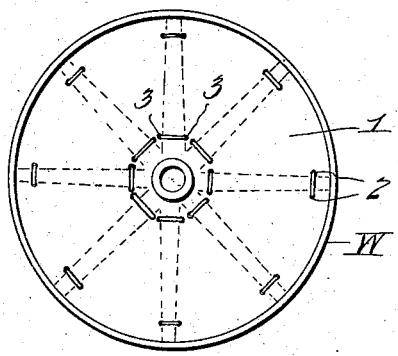
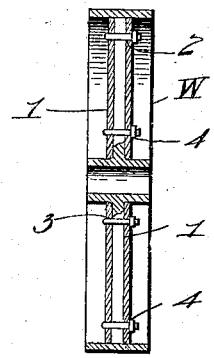
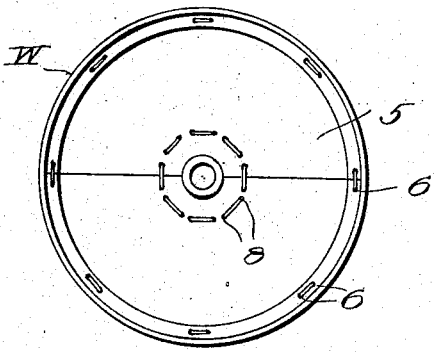
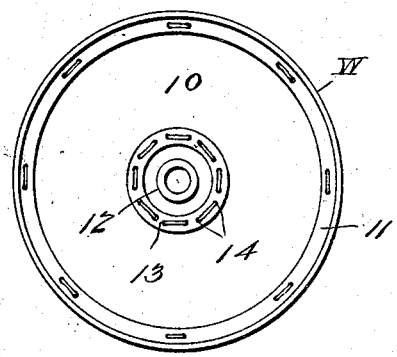
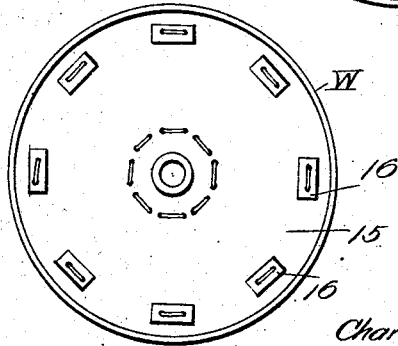
Witnesses
Inventor
Charles Johnston
By Geo. S. Vashon
Attorney

UNITED STATES PATENT OFFICE.

CHARLES JOHNSTON, OF BOYES, MONTANA.

WHEEL-GUARD.

No. 911,881.  Specification of Letters Patent.  Patented Feb. 9, 1909.

Application filed July 1, 1907. Serial No. 381,688.

*To all whom it may concern:*

Be it known that I, CHARLES JOHNSTON, a citizen of the United States, residing at Boyes, in the county of Custer and State of Montana, have invented new and useful Improvements in Wheel-Guards, of which the following is a specification.

This invention relates, generally, to "wheel guards", and more particularly to one of that class adapted for use in connection with pulleys, wheels of agricultural implements, or rapidly-driven fly-wheels.

The object of the invention is, without in any manner changing the structural arrangement of a wheel, to render it impossible for a person or an object to be caught by the spokes thereof, whereby accidents that are constantly occurring in factories and other places will be obviated.

With the above and other objects in view, as will appear as the nature of the invention is better understood, the same consists, generally stated, in a wheel guard or shield comprising a disk, adapted for connection with the spokes of a wheel or pulley, and to be disposed within the rim thereof, whereby in the case of rapidly-driven fly-wheels or pulleys the clothing or limbs of an operator cannot be caught, and in the case of agricultural implements, grain cannot be caught and wasted by being thrown to the ground.

The invention consists further in a novel construction and combination of parts of a wheel guard, as will be hereinafter fully described and claimed.

In the accompanying drawings forming a part of this specification, and in which like characters of reference indicate corresponding parts—Figure 1 is a view in side elevation of a wheel exhibiting the simplest form of the invention applied thereto; Fig. 2 is a view in transverse section through a wheel or pulley displaying two of the shields combined therewith; Fig. 3 is a detail view in elevation of a modified form of the invention; Fig. 4 is a similar view of another modified form thereof, and, Fig. 5 is a similar view of still another modified form.

Referring to the drawings, W designates a wheel which may be either a traction wheel, pulley or fly wheel. Disposed against the spokes and within the rim of the wheel is the guard or shield 1 which is constructed from an annulus of heavy sheet metal and is provided adjacent to its periphery and contiguous to its center with orifices 2 and 3, the latter orifices being arranged in a circle adjacent the hub of the wheel. These two sets of orifices are adapted to receive U-shaped bolts which will straddle the spokes and will carry on their inner ends, which will project beyond the guard, nuts 4.

In the form of invention shown in Fig. 2, two of the guards are employed, one on each side of the wheel, and which are shown as held assembled therewith in the manner above described.

In both embodiments of the invention above described the guard is a flat, or relatively flat annulus although it may be dished or otherwise shaped, but in one piece.

In the form of the invention shown in Fig. 3 the guard consists of two semi-circular sections 5, the perimeters of which are reinforced as by doubling the metal upon itself or otherwise, and through the reinforced portions extend openings 6 to receive bolts or other equivalent forms of fastening devices for securing the shields to the spokes. The chord of each section is provided at the center with a semi-circular recess to fit around the hub, and orifices 8 are provided adjacent to this recess to receive bolts for additionally securing the device in position.

In the form of the invention shown in Fig. 4 the shield 10 is marginally reinforced as at 11, and the hub recess 12 is similarly reinforced as at 13 and is provided with bolt-receiving orifices 14.

In the form of the invention shown in Fig. 5 the shield 15 is an annulus and is provided adjacent to its periphery with reinforcing plates 16 having orifices registering with those in the annulus to receive the fastening means.

Each of the forms shown is equally adapted for use in the connection described, and will, in a thoroughly practical manner, secure the objects sought.

What I claim is—

1. The combination with the hub, spokes and rim of a wheel, of a guard fitted over said hub and against the spokes, and having its surrounding peripheral portion contacting with the inner surface of the rim, said guard having a series of openings arranged in pairs around its central and marginal portions, U-shaped bolts inserted in said openings and against the spokes and means on said bolts for securing the guard to the spokes substantially as specified.

2. The combination with the hub, spokes and rim of a wheel, of a guard fitted over said hub and against the spokes and having its periphery contacting with the inner surface of the rim, a reinforce mounted on the marginal portion of the guard and having its periphery contacting with the inner surface of said rim, a supplementary reinforce arranged around the hub and against the guard, and said reinforce and said guard having a series of registering openings arranged in pairs therein, U-shaped bolts inserted in said registering openings and against the spokes, and means on said bolts for securing said reinforces and guard together, said bolts also adapted to secure the reinforces and guard to the spokes of the wheel substantially as specified.

In testimony whereof, I affix my signature in presence of two witnesses.

CHARLES JOHNSTON.

Witnesses:
   OLA ZIMMERMAN,
   LEAH ZIMMERMAN.